United States Patent
van Groningen

(10) Patent No.: US 11,449,548 B2
(45) Date of Patent: Sep. 20, 2022

(54) SYSTEMS AND METHODS FOR ENRICHING DOCUMENTS FOR INDEXING

(71) Applicant: Elasticsearch B.V., Mountain View, CA (US)

(72) Inventor: Martijn van Groningen, Hoofddorp (NL)

(73) Assignee: Elasticsearch B.V., Amsterdam (NL)

( * ) Notice: Subject to any disclaimer, the term of this patent is extended or adjusted under 35 U.S.C. 154(b) by 142 days.

(21) Appl. No.: 16/698,168

(22) Filed: Nov. 27, 2019

(65) Prior Publication Data
US 2021/0157846 A1    May 27, 2021

(51) Int. Cl.
G06F 16/00 (2019.01)
G06F 16/901 (2019.01)
G06F 16/93 (2019.01)
G06F 16/908 (2019.01)

(52) U.S. Cl.
CPC .......... *G06F 16/901* (2019.01); *G06F 16/908* (2019.01); *G06F 16/93* (2019.01)

(58) Field of Classification Search
CPC ...... G06F 16/901; G06F 16/93; G06F 16/908; G06F 16/212; G16H 10/60; G16H 40/20; G16H 30/20
See application file for complete search history.

(56) References Cited

U.S. PATENT DOCUMENTS

| | | | |
|---|---|---|---|
| 5,475,826 A | 12/1995 | Fischer | |
| 8,180,758 B1 * | 5/2012 | Cornali | G06F 16/28 707/707 |
| 9,977,805 B1 | 5/2018 | Bowman et al. | |
| 10,977,222 B1 | 4/2021 | Esman | |
| 2004/0267807 A1 | 12/2004 | Barabas et al. | |
| 2005/0289133 A1 * | 12/2005 | Arrouye | G06F 16/11 |
| 2006/0173985 A1 * | 8/2006 | Moore | H04L 67/00 707/E17.116 |
| 2006/0179337 A1 | 8/2006 | Goodman | |
| 2006/0184563 A1 | 8/2006 | Potter | |
| 2008/0137971 A1 * | 6/2008 | King | G06V 30/186 382/229 |

(Continued)

OTHER PUBLICATIONS

Veentjer, Ubbo. "File synchronization as a way to add quality metadata to research data." (Year: 2016).*

(Continued)

*Primary Examiner* — Syed H Hasan
(74) *Attorney, Agent, or Firm* — Quinn IP Law

(57) ABSTRACT

Provided are systems and methods for enriching documents for indexing. An example method can include receiving a plurality of documents and generating a plurality of enriched documents. The generation of the plurality of enriched documents can include determining, based on a document of the plurality of documents, reference data, determining, based on the reference data and an enrichment policy, additional data, and adding the additional data to the document. Prior to the generation of the plurality of enriched documents, the method may index the reference data of plurality of documents to obtain a source index and generate, based on the enrichment policy and the source index, an enrichment index. The determination of the additional data may include reading the additional data from the enrichment index.

20 Claims, 6 Drawing Sheets

(56) References Cited

U.S. PATENT DOCUMENTS

| | | |
|---|---|---|
| 2008/0195583 A1 | 8/2008 | Hsu et al. |
| 2009/0313503 A1 | 12/2009 | Atluri et al. |
| 2010/0212017 A1 | 8/2010 | Li et al. |
| 2011/0313971 A1 | 12/2011 | Hironaga |
| 2012/0011068 A1 | 1/2012 | Dearing et al. |
| 2013/0179407 A1 | 7/2013 | Stoakes |
| 2013/0262347 A1 | 10/2013 | Dodson |
| 2014/0074783 A1 | 3/2014 | Alsina et al. |
| 2014/0279893 A1* | 9/2014 | Branton .............. G06F 16/904 707/634 |
| 2015/0039598 A1* | 2/2015 | Hardy ................ G06F 16/951 707/723 |
| 2015/0058314 A1 | 2/2015 | Leclerc et al. |
| 2015/0082437 A1 | 3/2015 | Dodson |
| 2015/0331910 A1 | 11/2015 | Srinivasan et al. |
| 2015/0339600 A1 | 11/2015 | Dodson |
| 2016/0055188 A1* | 2/2016 | Goel ................... G06F 16/313 707/741 |
| 2016/0179933 A1* | 6/2016 | Dimassimo .......... G06F 16/316 707/711 |
| 2017/0017653 A1* | 1/2017 | Karim ................. G06F 16/487 |
| 2018/0234442 A1 | 8/2018 | Luo et al. |
| 2018/0253412 A1* | 9/2018 | Biswas ................ G06F 40/134 |
| 2019/0097909 A1 | 3/2019 | Puri et al. |
| 2019/0251422 A1* | 8/2019 | Ramanath .......... G06F 16/24578 |
| 2019/0370918 A1 | 12/2019 | Pemmaraju et al. |
| 2019/0394211 A1 | 12/2019 | Filsfils et al. |
| 2020/0034216 A1 | 1/2020 | Kolodzieski et al. |
| 2020/0160230 A1 | 5/2020 | Wang et al. |
| 2020/0183913 A1 | 6/2020 | Murphy et al. |
| 2020/0294165 A1 | 9/2020 | Yang |
| 2020/0311058 A1 | 10/2020 | Zielieke et al. |
| 2020/0341997 A1 | 10/2020 | Spitz et al. |
| 2020/0374268 A1* | 11/2020 | Wyatt ................ H04L 63/0236 |
| 2021/0200782 A1 | 7/2021 | Dodson et al. |

OTHER PUBLICATIONS

"query 1;" Microsoft Computer Dictionary; May 1, 2002; Microsoft Press; Fifth Edition; p. 433.

Drasner, Sarah; "Create your own Serverless API", Jul. 16, 2018; CSS-Tricks; 7 Pages.

Fumo, David; Types of Machine Learning Algorithms You Should Know; Jun. 15, 2017; Towards Data Science; pp. 1-5.

Turnbull, Doug; Machine Learning for Smarter Search With Elasticsearch; Feb. 24, 2017; dzone.com; 7 Pages.

"Howto continuously update the Elasticsearch index", hdmetor. github.io, Oct. 15, 2016, 6 Pages.

"Classification Definitions Class 715, Data Processing: Presentation Processing of Document, Operator Interface Processing, and Screen Saver Display Processing", Feb. 2011, pp. 1-33.

"How I found a job in San Francisco with Hackernews and Elasticsearch", hdmetor.github.io, Oct. 7, 2016, 6 Pages.

Lisa, "How to ignore index comparison for pandas assert frame equal," Stackoverflow.com, [retrieved Dec. 14, 2021], available online <URL:https://stackoverflow.com/questions/51655623.how-to-ignore-index-comparison-for-pandas-assert-frame-equal>, 2 pages.

* cited by examiner

SYSTEMS AND METHODS FOR ENRICHING DOCUMENTS FOR INDEXING

FIELD OF THE PRESENT TECHNOLOGY

The present technology relates generally to data processing, and more particularly, to systems and methods for enriching documents for indexing.

BACKGROUND

Search platforms can perform indexing of documents to optimize storage of the document and facilitate fast document retrieval. Prior to indexing, search platforms may pre-process documents. The pre-processing may include, for example, normalization of a text by removing extra spaces and converting the text to lowercase. In some cases, when pre-processing documents, it is desirable to enrich the documents with extra information to make the documents more informative upon retrieval. The extra information can also make indexing of documents more accurate. It is also important to ensure that the process of searching, retrieving, and adding the extra information does not add substantially to the time required for pre-processing and indexing the documents.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one embodiment of the disclosure, a method for enriching documents for indexing is provided. The method may include receiving a plurality of documents and generating a plurality of enriched documents. The generation of the plurality of enriched documents can include determining reference data based on a document of the plurality of documents. The generation of the plurality of enriched documents can further include determining, based on the reference data and an enrichment policy, additional data, and adding the additional data to the document. The method may further include indexing the plurality of enriched documents to generate a target index.

Prior to the generation of the plurality of enriched documents, the method may index the reference data of plurality of documents to obtain a source index. Thereafter, an enrichment index can be generated based on the enrichment policy and the source index. The additional data can be retrieved from the enrichment index. The additional data can be retrieved by performing a remote search in a batch, wherein the remote search includes a query of the additional data for at least two documents of the plurality of the documents.

The enrichment policy can define at least one data field to match the document to the reference data and at least one additional data field. Determining the additional data may include determining, based on reference data, a value for the data field and determining, based the value for the data field, a value for the additional data field. The additional data field and the value for the additional data field can be added to the additional data. The value of the additional field can be determined based on metadata associated with the document. The value of the additional field can be obtained from a look up table or a remote source. The enrichment policy may define a query for searching a value of the additional field in the look up table or the remote source.

The additional data may include geographical data associated with the document, an Internet protocol address associated with the document, a domain address associated with the document, user data associated with the document, and organization data associated with the document.

According to one example embodiment of the disclosure, a system for enriching documents for indexing is provided. The system may include a processor and a memory communicatively coupled to the processor. The memory may store instructions executable by the processor, wherein the processor can be configured to implement operations of the above-mentioned method for enriching documents for indexing upon execution of the instructions.

According to yet another aspect of the disclosure, there is provided a non-transitory processor-readable medium, which stores processor-readable instructions. When the processor-readable instructions are executed by a processor, they cause the processor to implement the above-mentioned method for enriching documents for indexing.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

The present disclosure is directed to various embodiments of systems and methods for enriching documents for indexing. The systems and methods can facilitate decreasing time needed for enriching the documents with additional data and for indexing the enriched document.

The systems and methods of present disclosure can enable a user to manage a source index containing the data used for enrichment of document and facilitate optimizing the source data to generate an enrichment index. The systems and methods of present disclosure may also allow the user to specify an enrichment policy. The enrichment policy may define a process of synchronization of the source index and the enrichment index. The enrichment policy may define data fields to be copied to the enrichment index from data sources. The enrichment policy may also define how often the data fields needed to be copied. The enrichment index can be stored locally on the node configured to enrich the documents. The enrichment index can be stored on the nodes other the nodes configured to enrich the documents. The node can be configured to read data fields from the enrichment index and modify the document based on the data fields.

Figure 1:
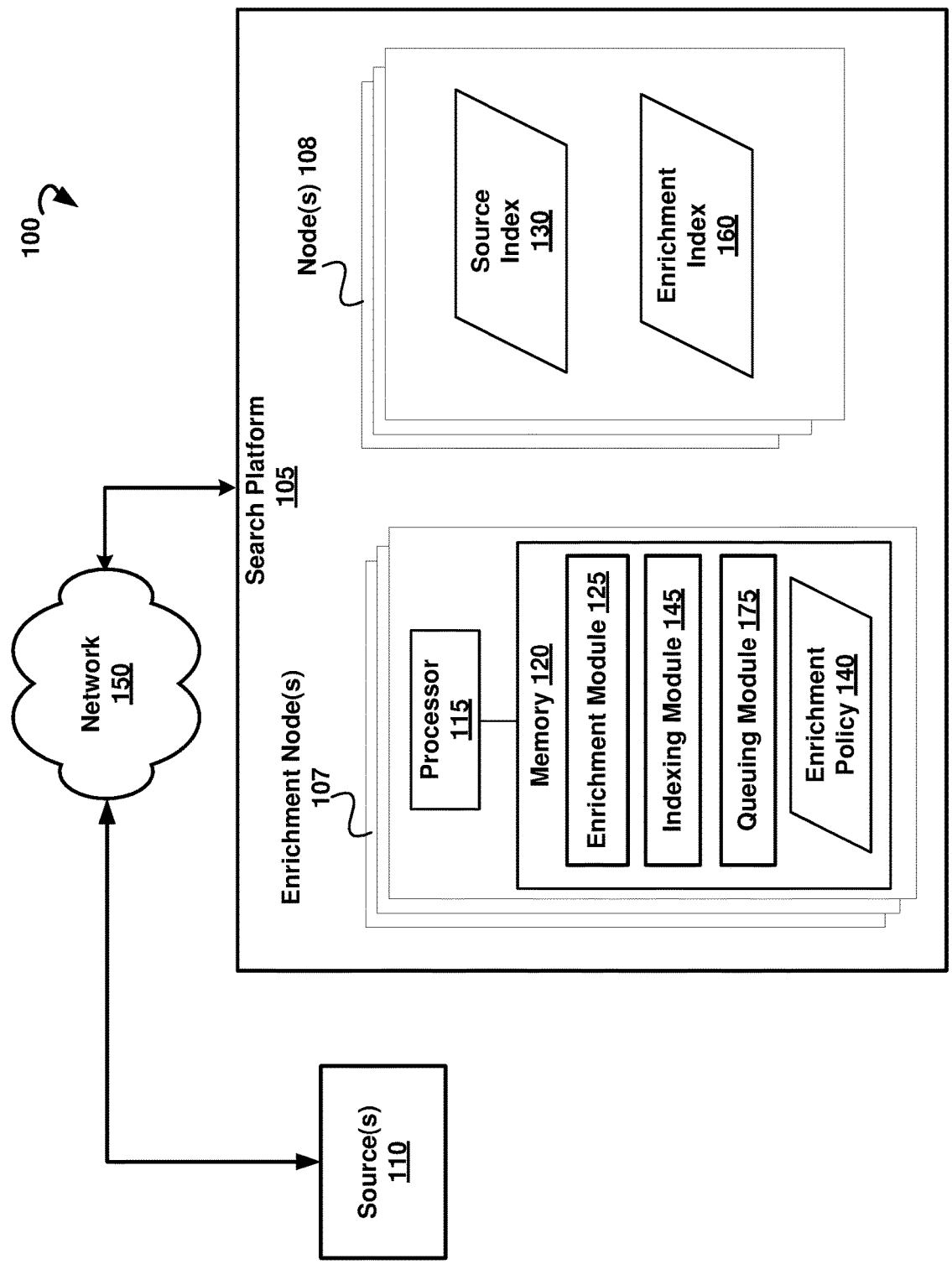
FIG. 1 is a block diagram of a computing architecture for practicing aspects of the present technology, according to example embodiments.

Referring now to the drawings, FIG. 1 is a high level schematic diagram of an exemplary computing architecture 100 (hereinafter referred to as architecture 100) of a computing environment of the present technology. The architecture 100 includes an exemplary search platform 105. In some embodiments, the search platform 105 includes a server or cloud-based computing device configured specifically to perform the analyses described herein. That is, the search platform 105 in some embodiments is a particular purpose computing device that is specifically designed and programmed (e.g., configured or adapted) to perform any of the methods described herein. The search platform 105 can also include a plurality of distributed computing systems that cooperatively provide the features of the search platform 105. For example, individual ones of the plurality of distributed computing systems can provide one or more unique functions or services. In some embodiments, the search platform 105 can comprise a cloud computing environment or other similar networked computing system.

The search platform 105 can be communicatively coupled, via a network 150, with one or more source(s) 110 that provides an input data to the search platform 105. The source(s) 110 can include, for example, a computing system, an enterprise network, a plurality of computing systems arranged as a network, virtual machines, application(s), network tap(s), services, a cloud, containers, or other similar computing environment that creates data instances. In some embodiments, the source(s) 110 includes a database or data store that stores pre-obtained data from any of the aforementioned sources for use in accordance with the present disclosure.

In one embodiment, the search platform 105 may include one or more enrichment node(s) 107 and one or more node(s) 108 connected in a computer network. Each of the enrichment node(s) 107 may include a processor 115 and a memory 120. The memory 120 may store modules including processor-executable instructions. The memory 120 may include an enrichment module 125, an indexing module 145, and a queuing module 175. The terms "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

In some embodiments, the memory 120 may include data for operations of the modules 125, 145, and 175. The memory 120 may include an enrichment policy 140.

The enrichment node(s) 107 can be configured to store a source index 130 and an enrichment index 160. In some embodiments, the enrichment index 160 and/or the source index 160 can be stored in the enrichment node(s) 107.

In some embodiments, the search platform 105 receives, via the network 150, an input from the source(s) 110. The input may include request to write documents to indices (databases). The input may also include a query to search the documents in indices. The documents may include one or more data fields. The documents can be indexed based on values of the data fields.

In some embodiments, the enrichment module 125 enriches documents prior to indexing. Each of the documents may include reference data. The enrichment module 125 can determine, based on the reference data, additional data and then add the additional data to the document. The indexing module 145 may index the enriched documents to generate a target index. The queuing module 175 may perform remote searches for the additional data in batches. The queuing module 175 may include a single query for additional data of two and more documents.

Figure 2:
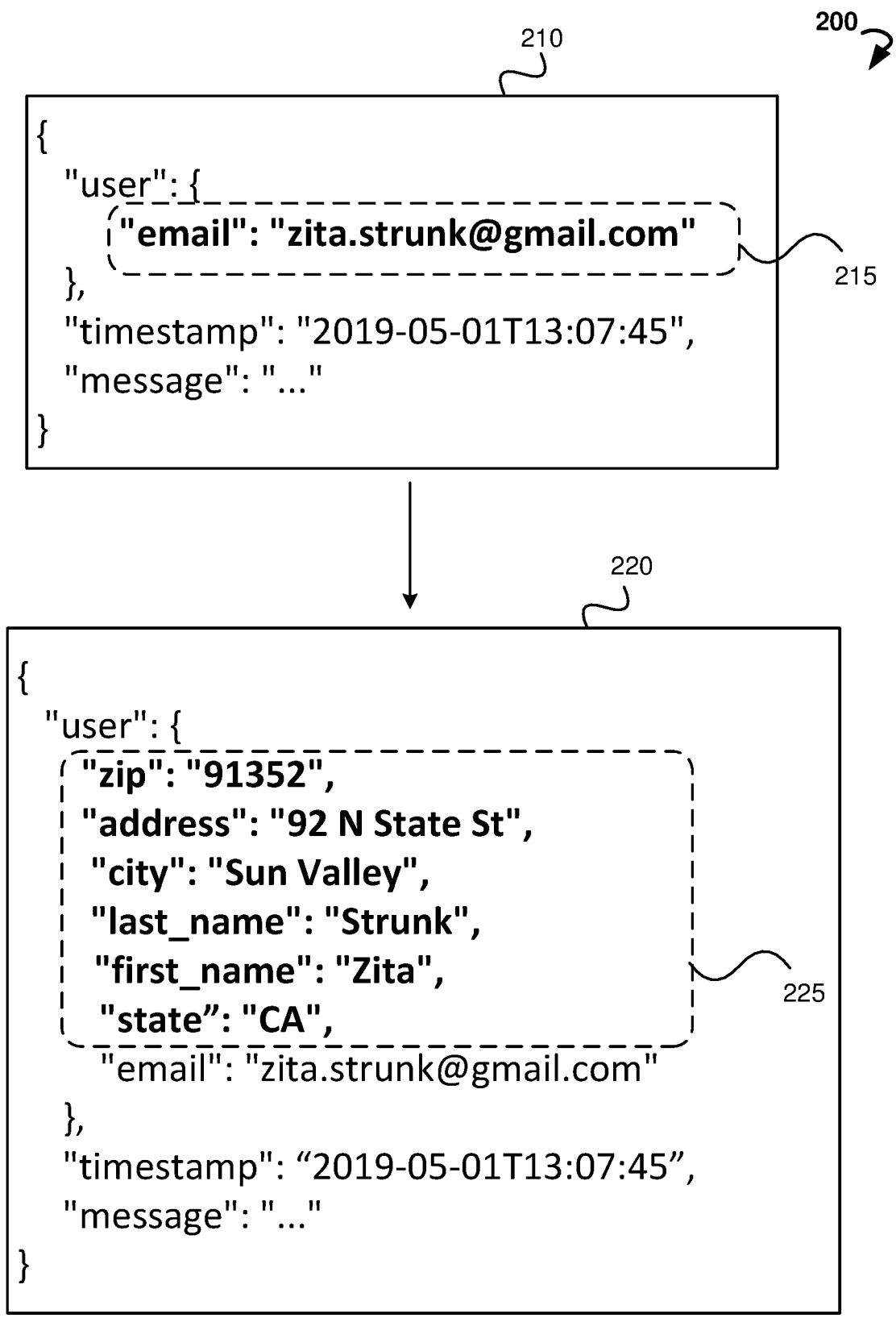
FIG. 2 is a schematic diagram showing a document and an enriched document, according to an example embodiment.

FIG. 2 is a schematic diagram 200 showing a document 210 and enriched document 220, according to an example embodiment. In example of FIG. 2, the document 210 and the enriched document 220 are represented in Java Script Object Notation (JSON) format for illustrative purposes. In general, the document 210 and document 220 can be in any other document format. The document 210 includes reference data 215. The reference data can include data field "email" and a value of the data field specific to a user of the document. The enrichment module 125 can determine, based on the reference data 215, additional information 225 concerning the user. The additional information can include name of the user and address of the user and can be retrieved from user data stored in the node(s) 108 or from a remote source in response to a query. The query may include keywords, for example, data fields to be matched and/or additional data fields to be specified with values. The additional information can be also retrieved from the metadata of the document.

In various embodiments, the documents can be enriched with geographical data, Internet Protocol addresses associated with cloud vendors, infrastructure architecture data, domain name part of a curated link index in the document, user information, and organization information.

Figure 3:
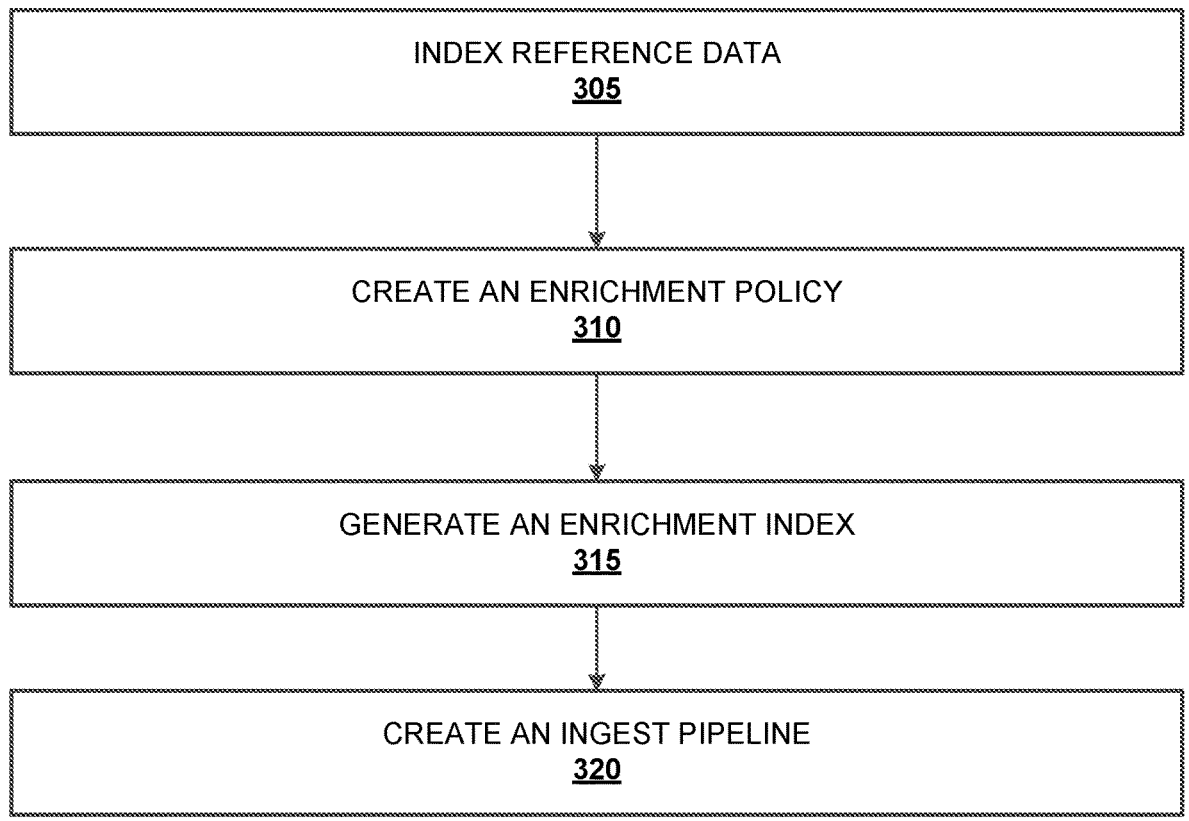
FIG. 3 is a flow chart showing a process of configuration of a node to perform enrichment of documents for indexing.

FIG. 3 is a flow chart showing a process 300 of configuration of the enrichment node 107 to perform enrichment of documents for indexing. In block 305, the process 300 can commence with indexing of the reference data of the documents to generate a source index 130. The reference data can be assumed to be of a smaller scale. The reference data can be fitted to a single short Lucene index or a single partition of index. For example, the reference data can be fitted to a single Elasticsearch™ shard. It can also be assumed that the reference data do not change frequently with time. In some embodiments, the source index can be stored locally in the node to avoid remote calls for retrieving data from the source index 130. The source index can be managed and updated by a user of the search platform 105 via a user interface (UI).

In block 310, the process 300 can create an enrichment policy 140. The enrichment policy 140 may define look up keys in the source index 130. The enrichment policy may also include fields to be included in the documents being enriched. The enrichment policy 140 can be created and modified by the user of the search platform 105 via the UI. For example, the enrichment policy can be managed via Elasticsearch™ application program interface (API).

The enrichment policy may include a type, one or more sources indices (one or more databases) to be searched for additional data, fields to be matched during the search to generate an enrichment index, a query to be used in the search, and fields to be retrieved based on the search. In example of FIG. 2, the enrichment policy defines that the search is performed in the index "user", field to be matched is "email", and fields to be retrieved (and then added to the document) are "zip", "address", "city", "last_name", "first_name", and "state". In other embodiments, the field to be matched may include a social security number, organization name, geolocation, IP address, and others.

In block 315, the process 300 can proceed with generating an enrichment index 160. The enrichment index 160 is an optimized data store for the source index 130. The enrichment index 160 can be generated based on the enrichment policy 140. The enrichment index 160 may include additional data to be added to the documents based on values for look up keys in the source index. In some embodiments, the enrichment index 160 can be stored locally at the node. In other embodiments, the enrichment index can be stored remotely at nodes which do not perform enrichment of documents. In these embodiments, the enrichment node can be configured to perform remote searches for additional data in order to enrich documents. Thus, the enrichment index 160 can be used for looking up of additional data to be added to enriched documents.

In block 320, the process 300 includes creating a ingest pipeline. The ingest pipeline is a configuration defining how the documents are modified prior to being indexed. For example, the ingest pipeline can indicate which field from the reference data of the documents to be searched in the enrichment index to retrieve the additional data to be added to the documents.

Figure 4:
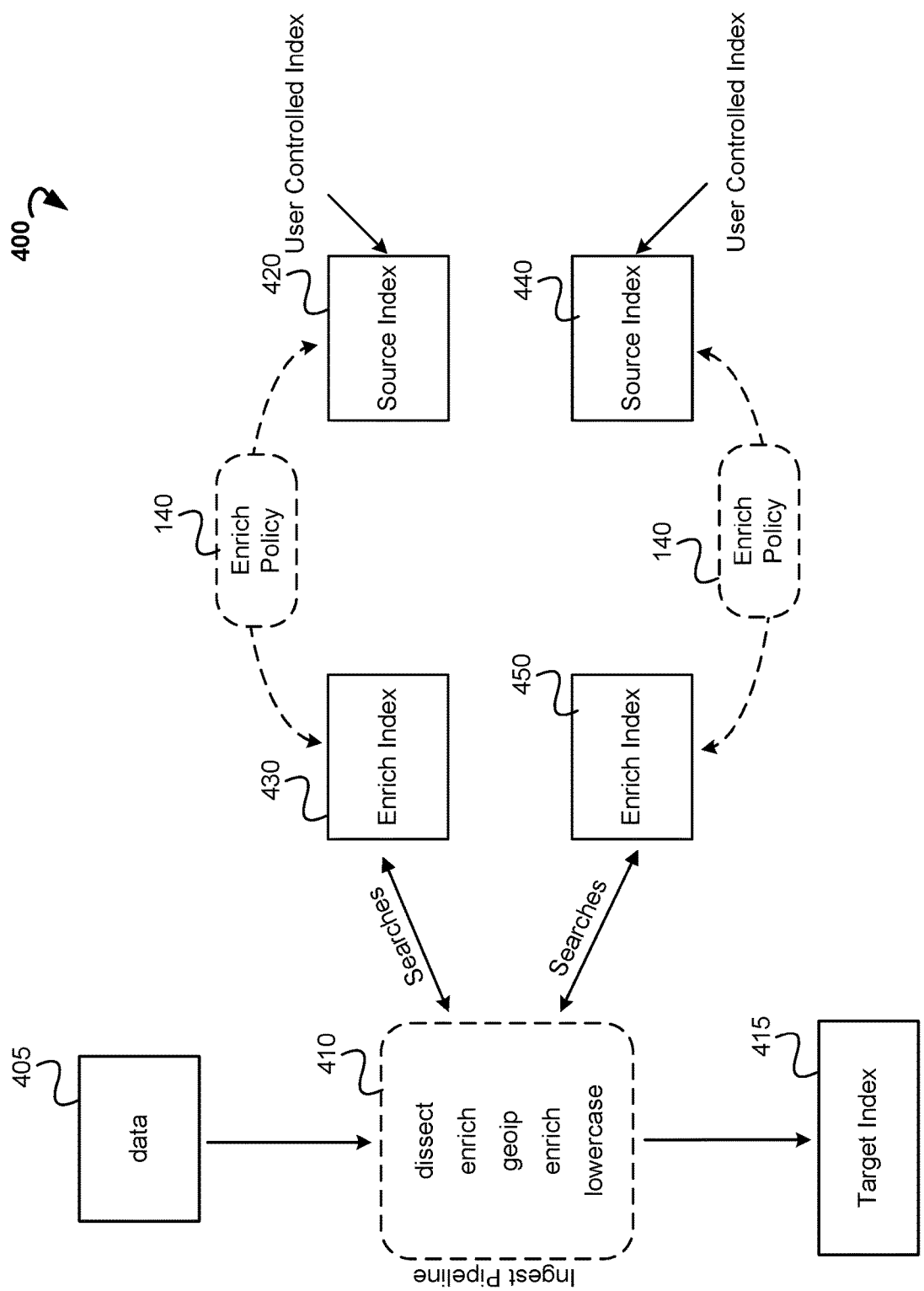
FIG. 4 an example overall diagram illustrating various aspects and process flow of enriching documents for indexing, according to some example embodiments.

FIG. 4 an example overall diagram 400 illustrating various aspects and process flow for enriching documents for indexing, according to some example embodiments.

The search platform 105 (shown in FIG. 1) can receive data 405. The data may include incoming write requests and documents to be indexed. The data 405 may then be forwarded to one of the enrichment node(s) 107 (shown in FIG. 1) for processing.

The node(s) 408 (shown in FIG. 1), which can be different from the enrichment node(s) 407, may store source indices 420 and 440. The source indices 420 and 440 can be generated based on reference data of the documents. The documents may not include the data to be added to the document based on the enrichment policy 140.

The source indices 420 and 440 can be managed by a user of the search platform 105. The enrichment node(s) 407 may generate enrichment indices 430 and 450. The enrichment index 430 can be generated by enriching the source index 420 based on enrichment policy 140. The enrichment index 450 can be generated by enriching the source index 440 based on the enrichment policy 140. The enrichment node(s) 407 can be configured to add new enrichment indices, delete old enrichment indices, and so forth.

The enrichment node(s) 407 can modify the received documents based on the ingest pipeline 410. For example, the node(s) 407 may perform searches in the enrichment indices 430 and 450 to determine additional data to be added to the document. After the additional data are added to the documents, the documents can be indexed to generate a target index 415.

The searches for additional data can be performed locally on the node(s) 407 or on remote servers. If the searches are carried out remotely on node(s) 408, then a queuing mechanism can be used to make remote look up calls efficiently. The queuing mechanism can perform the remote searches in batches. A coordinator mechanism can be used to make sure that a single remote search includes query for more than one document. The coordinator mechanism can be used to distribute the load of searches for documents which can be received from multiple source(s) 110 (shown in FIG. 1).

Figure 5:
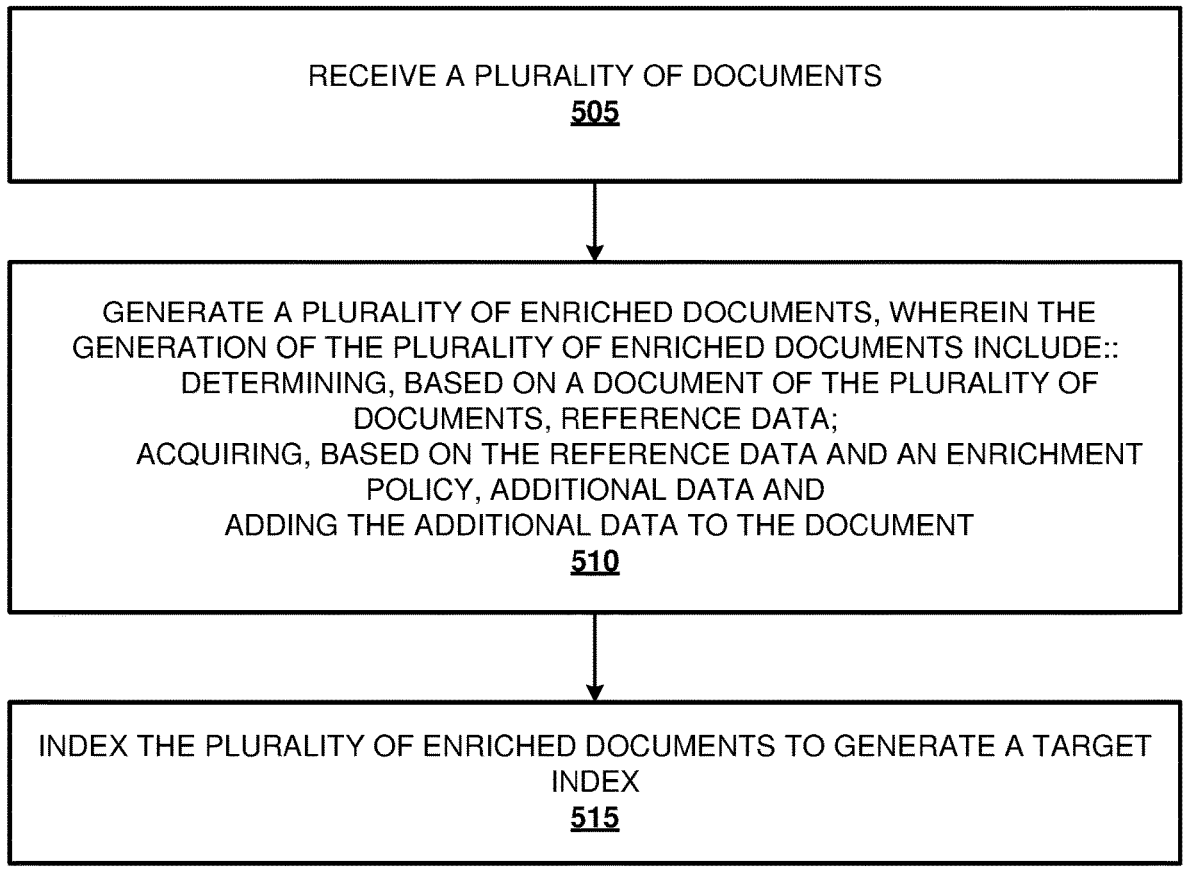
FIG. 5 is a flow chart showing operations of a method for enriching documents for indexing, according to an example embodiment.

FIG. 5 is a flow chart of a method 500 for enriching documents for indexing, according to an example embodiment. The method 500 can commence, in block 505, with receiving a plurality of documents.

In block 510, the method 500 may proceed with generating a plurality of enriched documents. The generation of the plurality of enriched documents may include determining reference data based on a document of the plurality of documents. The generation of the plurality of enriched documents may also include determining additional data, based on the reference data and an enrichment policy. The additional data can be then added to the document.

In some embodiments, the reference data can be indexed and stored in a source index. An enrichment index can be generated based on the enrichment policy and the source index. In these embodiments, determining the additional data includes reading the additional data from the enrichment index. The enrichment policy may define at least one data field in the reference data and at least one additional data field to be added to the document. The enrichment policy may also define a search query and an index to be used for searching a value of the additional data field. In block 515, the method 500 may proceed with indexing the plurality of enriched documents to generate a target index.

Figure 6:
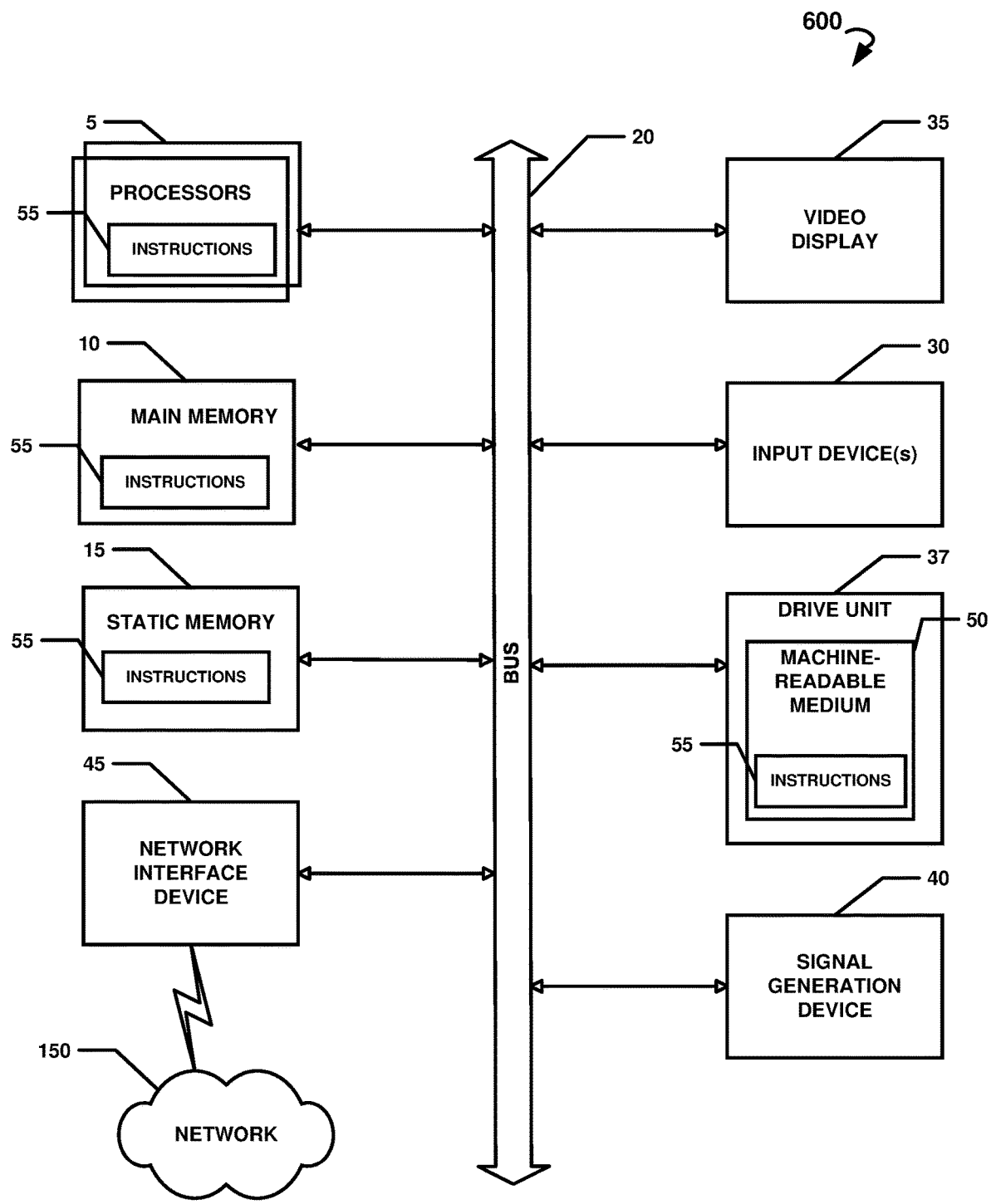
FIG. 6 is a schematic diagram of a computing system that is used to implement embodiments according to the present technology.

FIG. 6 is a diagrammatic representation of an example machine in the form of a computer system 600, within which a set of instructions for causing the machine to perform any one or more of the methodologies discussed herein may be executed. In various example embodiments, the machine operates as a standalone device or may be connected (e.g., networked) to other machines.

In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processor or multiple processor(s) 5 (e.g., a CPU, a graphics processing unit (GPU), or both), and a main memory 10 and static memory 15, which communicate with each other via a bus 20. The computer system 600 may further include a video display 35 (e.g., a liquid crystal display (LCD)). The computer system 600 may also include input device(s) 30 (also referred to as alpha-numeric input device(s), e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 600 may further include a data encryption module (not shown) to encrypt data.

The drive unit 37 includes a machine-readable medium 50 (which may be a computer readable medium) on which is stored one or more sets of instructions and data structures (e.g., instructions 55) embodying or utilizing any one or more of the methodologies or functions described herein. The instructions 55 may also reside, completely or at least partially, within the main memory 10 and/or within the processor(s) 5 during execution thereof by the computer system 600. The main memory 10 and the processor(s) 5 may also constitute machine-readable media.

The instructions 55 may further be transmitted or received over a network (e.g., network 150, see FIG. 1) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Additionally, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer-implemented method for enriching documents for indexing, the method comprising:
   receiving a plurality of documents by a search platform, the search platform comprising an enrichment node coupled to a plurality of other nodes via a computer network;
   indexing, by the enrichment node, the reference data of the plurality of documents to obtain a source index;
   generating, by the enrichment node, based on an enrichment policy and the source index, an enrichment index and data structure accessible via the enrichment index, the enrichment index being stored on at least one of the enrichment node and the plurality of other nodes;
   generating a plurality of enriched documents, wherein the generating includes:
      determining, by the enrichment node, reference data, based on a document of the plurality of documents;
      determining additional data by at least one of:
         reading the additional data from the enrichment index, the reading including searching in batches, by the plurality of other nodes and a queuing module of the enrichment node, for the additional data, via the computer network, the determining of the additional data being based on the reference data and the enrichment policy; and
         retrieving the additional data from metadata of a document of the plurality of documents; and
      adding, by the enrichment node, the additional data to the document; and
   indexing the plurality of enriched documents to generate a target index.

2. The method of claim 1, wherein the reading of the additional data includes performing a remote search in a batch, the remote search including a query for the additional data of at least two documents of the plurality of the documents.

3. The method of claim 1, wherein the enrichment policy defines:
   at least one data field to match the document to the reference data; and
   at least one additional data field.

4. The method of claim 3, wherein the determining of the additional data includes:
- determining, based on reference data, a value of the at least one data field;
- determining, based on the at least one data field and the value of the at least one data field, a value of the additional data field; and
- adding the at least one additional data field and the value of the one additional data filed to the additional data.

5. The method of claim 4, wherein the value of the at least one additional field is determined based on metadata of the document.

6. The method of claim 4, wherein the value of the at least one additional field is determined via a look up table or a remote source.

7. The method of claim 6, wherein the enrichment policy defines a query for searching the value of the at least one additional field in the reference data.

8. The method of claim 1, wherein the additional data includes one of: geographical data associated with the document, an Internet protocol address associated with document, and a domain address associated with the document.

9. The method of claim 1, wherein the additional data includes one of: user data associated with the document and organization data associated with the document.

10. A system for enriching documents for indexing, the system comprising:
- a processor; and
- a memory communicatively coupled to the processor, the memory storing instructions executable by the processor to perform a method, the method comprising:
  - receiving a plurality of documents by a search platform, the search platform comprising an enrichment node coupled to a plurality of nodes via a computer network;
  - modifying, by the enrichment node, the plurality of documents prior to indexing, based on a field indicated by an ingest pipeline, the ingest pipeline being configured to indicate which field from a reference data of the plurality of documents is searched in an enrichment index to retrieve additional data to be added to the plurality of documents, the enrichment index being stored on at least one of the enrichment node and the plurality of other nodes;
  - generating a plurality of enriched documents, wherein the generating includes:
    - determining, by the enrichment node, additional data by at least one of:
      - reading the additional data from the enrichment index, the reading including searching in batches, by the plurality of other nodes and a queuing module of the enrichment node, for the additional data, via the computer network, the determining of the additional data being based on the reference data and the enrichment policy; and
      - retrieving the additional data from metadata of a document of the plurality of documents; and
    - adding the additional data to the document; and
  - indexing the plurality of enriched documents to generate the enrichment index.

11. The system of claim 10, further comprising, prior to the generating the plurality of enriched documents:
- indexing the reference data of plurality of documents to obtain a source index; and
- generating, based on the enrichment policy and the source index, a data structure accessible via the enrichment index; and wherein the determining of the additional data includes reading the additional data from the enrichment index.

12. The system of claim 11, wherein the reading of the additional data includes performing a remote search in a batch, the remote search including a query for the additional data of at least two documents of the plurality of the documents.

13. The system of claim 10, wherein the enrichment policy defines:
- at least one data field to match the document to the reference data; and
- at least one additional data field.

14. The system of claim 13, wherein the determining of the additional data includes:
- determining, based on reference data, a value for the at least one data field;
- determining, based on the at least one data field and the value for the at least one data field, a value for the additional data field; and
- adding the at least one additional data field and the value for the one additional data filed to the additional data.

15. The system of claim 14, wherein the value of the at least one additional field is determined based on metadata of the document.

16. The system of claim 14, wherein the value of the at least one additional field is determined via a look up table or a remote source.

17. The system of claim 16, wherein the enrichment policy defines a query for searching the value of the at least one additional field in the reference data.

18. The system of claim 10, wherein the additional data includes one of: geographical data associated with the document, an Internet protocol address associated with document, a domain address associated with the document, user data associated with the document, and organization data associated with the document.

19. A non-transitory processor-readable medium having instructions stored thereon, which when executed by one or more processors, cause the one or more processors to implement a computer-implemented method for enriching documents for indexing, the method comprising:
- establishing a remote search which comprises a single query for more than one document;
- distributing a load of searches for a plurality of documents based on the single query;
- receiving a plurality of documents from a plurality of sources in response to the load of searches via a search platform, the search platform comprising an enrichment node coupled to a plurality of nodes via a computer network;
- generating a plurality of enriched documents, wherein the generating includes:
  - determining, by the enrichment node, reference data, based on a document of the plurality of documents;
  - determining additional data by at least one of:
    - reading the additional data from the enrichment index, the reading including searching in batches, by the plurality of other nodes and a queuing module of the enrichment node, for the additional data, via the computer network, the determining of the additional data being based on the reference data and the enrichment policy; and retrieving the additional data from metadata of a document of the plurality of documents; and adding the additional data to the document; and indexing the plurality of enriched documents to generate an enrichment index.

20. The method of claim 19, wherein the reading of the additional data includes performing a remote search in a batch, the remote search including a query for the additional data of at least two documents of the plurality of the documents.

* * * * *